(12) United States Patent
Gyorfi et al.

(10) Patent No.: US 9,164,179 B2
(45) Date of Patent: Oct. 20, 2015

(54) SYSTEMS AND METHODS FOR GENERATING COMPENSATED SPEED VALUES FOR DOPPLER-ENABLED DEVICE

(71) Applicant: Google Technology Holdings LLC, Mountain View, CA (US)

(72) Inventors: Julius S Gyorfi, Vernon Hills, IL (US); Amitkumar N Balar, Mundelein, IL (US); Shakil Barkat, Gurnee, IL (US); Sajid I Dalvi, Aurora, IL (US); Hideki Yoshino, Lake Zurich, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 391 days.

(21) Appl. No.: 13/666,572

(22) Filed: Nov. 1, 2012

(65) Prior Publication Data

US 2014/0118189 A1    May 1, 2014

(51) Int. Cl.
*G01S 19/52* (2010.01)
*G01S 11/10* (2006.01)

(52) U.S. Cl.
CPC .......... *G01S 19/52* (2013.01); *G01S 11/10* (2013.01)

(58) Field of Classification Search
USPC ............... 342/357.2, 357.35, 357.46, 357.78, 342/461; 701/468, 480, 507
See application file for complete search history.

(56) References Cited

U.S. PATENT DOCUMENTS

| | | | |
|---|---|---|---|
| 5,525,998 A * | 6/1996 | Geier | 342/357.3 |
| 6,388,613 B1 | 5/2002 | Nagatsuma et al. | |
| 7,566,290 B2 | 7/2009 | Lee et al. | |
| 7,828,697 B1 | 11/2010 | Oberrieder et al. | |
| 7,895,013 B2 | 2/2011 | Dietz et al. | |
| 7,944,394 B2 | 5/2011 | van Diggelen | |

(Continued)

FOREIGN PATENT DOCUMENTS

| | | |
|---|---|---|
| JP | 2008175730 A | 7/2008 |
| JP | 200925045 A | 2/2009 |
| WO | 2004048995 A1 | 6/2004 |

(Continued)

OTHER PUBLICATIONS

Patent Cooperation Treaty, "PCT Search Report and Written Opinion of the International Searching Authority" for International Application No. PCT/US2013/065832, Jan. 31, 2014, 11 pages.

*Primary Examiner* — Dao Phan
(74) *Attorney, Agent, or Firm* — Johnson, Marcou & Isaacs, LLC (57) ABSTRACT

Implementations relate to systems and methods for generating compensated speed values for a Doppler-enabled device. A portable wireless device can contain a GPS navigation engine (110) to capture position data (120) and Doppler speed data (118) from positioning satellites. The device can also generate position-based speed values from successive position readings and time intervals, to determine the current speed independently of the Doppler-based speed values. During degraded signal conditions, the Doppler-based speed values can drop to invalid levels. The device incorporates a combiner module (450) which compares the position-based and Doppler-based speed values and performs combination operations on those quantities to produce a compensated speed value (490). By selecting the maximum or otherwise combining those values, extreme excursions in speed values are avoided and accuracy promoted.

19 Claims, 6 Drawing Sheets

(56) References Cited

U.S. PATENT DOCUMENTS

| | | |
|---|---|---|
| 8,103,153 B2 | 1/2012 | Uhl et al. |
| 8,125,378 B1 | 2/2012 | Jarpenvaa |
| 2003/0216865 A1* | 11/2003 | Riewe et al. ................ 701/220 |
| 2011/0156954 A1 | 6/2011 | Roh et al. |

FOREIGN PATENT DOCUMENTS

| | | |
|---|---|---|
| WO | 2008108194 A2 | 9/2008 |

* cited by examiner

| | $t_0$ | $t_1$ | $t_2$ | $t_3$ | ... | $t_x$ |
|---|---|---|---|---|---|---|
| 415 — FILTERED DOPPLER BASED SPEED VALUE | 6.6 mph | 6.7 mph | 3.4 mph | ... | a |
| 439 — FILTERED POSITION-BASED SPEED VALUE | 6.4 mph | 6.5 mph | 6.6 mph | ... | b |
| 490 — COMPENSATED SPEED VALUE | 6.6 mph | 6.7 mph | 6.6 mph | ... | MAX(a, b) |

610 — SPEED OUTPUT HISTORY

SYSTEMS AND METHODS FOR GENERATING COMPENSATED SPEED VALUES FOR DOPPLER-ENABLED DEVICE

FIELD

The present teachings relate to systems and methods for generating compensated speed values for a Doppler-enabled device, and more particularly, to platforms and techniques for generating a speed value for a device that may be experiencing degradation in receipt of Global Positioning System (GPS) or other position signals.

BACKGROUND

In competitive running and personal recreation applications, a person wearing or using a mobile device may use satellite positioning platforms, including global positioning satellite (GPS) systems, to track location and speed. In some mobile devices, device speed may be calculated from Doppler shifts in the carrier wavelengths of received positioning signals. In these Doppler-enabled devices, the shift in carrier wavelength of the set of positioning signals due to the relative motion of the device as compared to the motion of the set of GPS satellites can be used to determine a speed of the device.

At times, however, the signals from GPS satellites can be obscured by trees, buildings, weather, or other types of interference or obstructions. When Doppler GPS tracking is degraded, the speed value that is output by the device tends to be reduced to a significant degree. The resulting speed value may not reflect or even reasonably approximate the user's true speed during those conditions. Users may not have a positive experience with speed tracking services that generate invalid speed values at unpredictable times due to signal degradation.

There is an opportunity to provide methods and systems for generating compensated speed values for a Doppler-enabled device, in which a value of a user's speed while running or performing other activities can be generated during degraded Doppler GPS conditions while maintaining a comparatively high degree of accuracy.

DESCRIPTION OF DRAWINGS

The accompanying drawings, which are incorporated in and constitute a part of this specification, illustrate implementations of the present teachings and together with the description, serve to explain the principles of the present teachings. In the figures.

DETAILED DESCRIPTION

Implementations of the present teachings relate to systems and methods for generating compensated speed values for a Doppler-enabled device. More particularly, implementations relate to platforms and techniques for generating, determining, or estimating the speed of a device worn or carried by a user. The device can be equipped with sensing and tracking devices and/or modules including a navigation engine and a speed comparison module, along with radio frequency (RF) circuitry to receive and/or communicate with GPS, wireless wide area networks (WWANs), wireless local area networks (WLANs), and/or other services. During operating conditions where the device is in the clear to receive signals from positioning satellites, the device can process a set of received Doppler-shifted carrier signals to generate an accurate Doppler-based value of the speed of the device.

The device can also be configured to track position data based on a set of timing and location values derived from the positioning signals and then calculate values for current speed directly from receiver position and time stamp data. In those speed calculations, the speed values are calculated by dividing elapsed distance by elapsed time. In implementations, one or both of the Doppler-based speed data and the position-based speed data can be filtered to remove outliers in the stream of computed speed values. The use of a filter on one or both speed data streams can promote smooth speed variations rather than abrupt speed changes.

A combiner module in the device can combine the Doppler-based speed values and the position-based speed values using a predetermined set of combination rules. The combination rule or rules can, in implementations, include the selection of the greater or higher value between the Doppler-based and position-based speed values. The use of a rule that selects the maximum value from the Doppler-based speed data and position-based speed data over the same time period can tend to increase the determined speed to an accurate value during periods when Doppler-based speeds are "sagging" due to degradation in receipt of GPS signals. The user can thus receive and/or view a set of compensated speed values on the device that avoids spurious or inconsistent readings under difficult operating conditions, including those in which GPS or other positioning signals may be obscured, degraded, or briefly unavailable.

Reference will now be made in detail to exemplary implementations of the present teachings, which are illustrated in the accompanying drawings. Where possible the same reference numbers will be used throughout the drawings to refer to the same or like parts.

Figure 1:
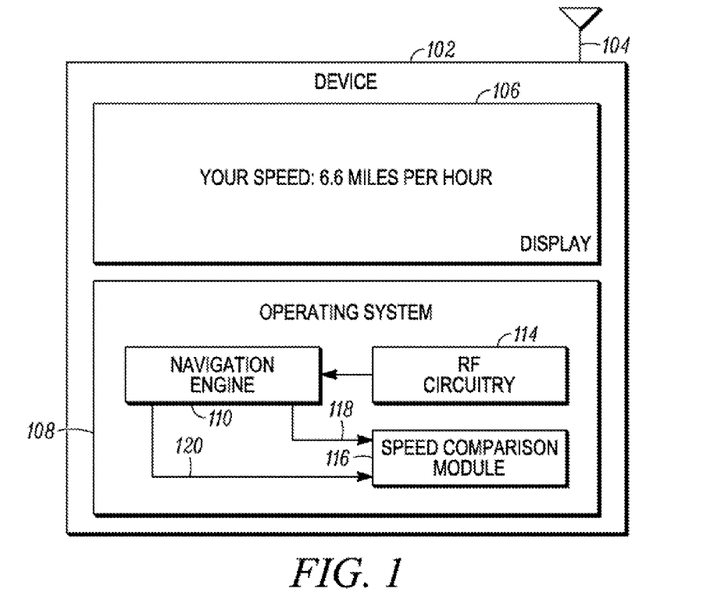
FIG. 1 illustrates a device that can be used in systems and methods for generating compensated speed values for a Doppler-enabled device, according to various implementations.

FIG. 1 illustrates a device 102 that can be used in systems and methods for generating compensated speed values for a Doppler-enabled device. In aspects as shown, the device 102 can be configured with hardware, software, firmware, services, and/or other resources to permit the device 102 to detect, capture, track, generate, and/or estimate speed values or data related to the motion of the device 102. The device 102 can include a network-enabled communication component, such as, for example, a cellular (3GPP, 3GPP2, LTE) transceiver, a WiFi (IEEE 802.11) transceiver, a WiMAX (IEEE 802.16) transceiver, a Bluetooth (IEEE 802.15) transceiver, an infrared transceiver, and/or other standardized or proprietary communication transceivers and communication buses (such as Ethernet and USB). With such a transceiver, the electronic device 102 can support voice and/or data communications and thus may include a dialing (e.g., telephony) application, a messaging (e.g., email, text messaging, instant messaging) application, a digital audio (e.g., MP3) player application, a digital video player application, and/or a data synchronization application.

The device 102 can have a small form-factor such as a watch-style device, an arm-band device, a belt-style device, or a head-set device. As shown, the electronic device 102 can be portable and host or incorporate a number of hardware, software, and/or other resources, including a display 106 and an operating system 108.

The display 106 can be or include a light-emitting diode (LED) display, a liquid crystal display (LCD), and/or other types of displays having other types of panels or illumination elements. In some implementations, the display 106 can incorporate hardware-based input components such as, for example, a capacitive or resistive touch-sensitive panel allowing the user to enter data based on touch-points or other actions on the screen. As noted, the device 102 can be configured in a comparatively small form factor, but the touch screen or display screen may be larger for low-vision applications or other use cases. The device 102 can incorporate other input and output components such as, for example, audio output via a speaker, audio input via a microphone, visual input via a camera, and/or control input via mechanical buttons or switches.

As shown, the electronic device 102 can host or incorporate further hardware, software, and/or other services or resources to provide an overall framework for operating the device 102 and conducting input, communications, and/or other activity. The resources of the electronic device 102 can include, for example, an operating system 108 installed on the electronic device 102 and controlling the data storage, processing, communications, and/or other resources of the electronic device 102 and/or accessed via the electronic device 102. The device 102 can incorporate radio frequency (RF) circuitry 114, along with one or more antennas 104, to enable wireless signaling with personal area networks, local area networks, wide area networks, positioning satellites, and/or other networks, nodes, or stations.

The device 102 can also incorporate resources related to the capture, storage, analysis, and tracking of speed-related data. Those integrated resources can include, as illustrated, a navigation engine 110 and a speed comparison module 116. In implementations, the navigation engine 110 can be or include a GPS chip, platform, service, and/or module, capable of receiving signals from associated satellite and/or terrestrial base stations and translating those signals into position, location, speed, elevation, time, and/or other data with a comparatively high degree of accuracy. In implementations, the navigation engine 110 can be or include other types or classes of location or position hardware, software, and/or services, such as location modules based on the known geographic location of cellular towers or their sectors, location modules that operate based on radio triangulation techniques, or others. In implementations, for example, the navigation engine 110 can additionally or alternately be based on the Galileo satellite tracking system, and/or others.

The speed comparison module 116 of the device 102 can be configured to track and calculate a compensated and/or otherwise computed speed of the device 102 and display the speed value on the display 106. In implementations, the speed value can be displayed in miles per hour (as shown), but can also be configured to be displayed in feet per second, kilometers per hour, and/or other units or measures. Pace values, namely minutes per mile or other time over distance values, can also or alternately be displayed. In implementations, the speed comparison module 116 and/or other hardware, module, application, and/or service can be configured to display the speed value on the display 106 continuously, at regular intervals, upon receiving an input or selection from the user, and/or at other times or under other conditions.

The speed comparison module 116 and/or other hardware, module, application, and/or service can incorporate processor, memory, logic, software, and/or other resources to generate all speed values and conduct other operations, as described herein.

Figure 2:
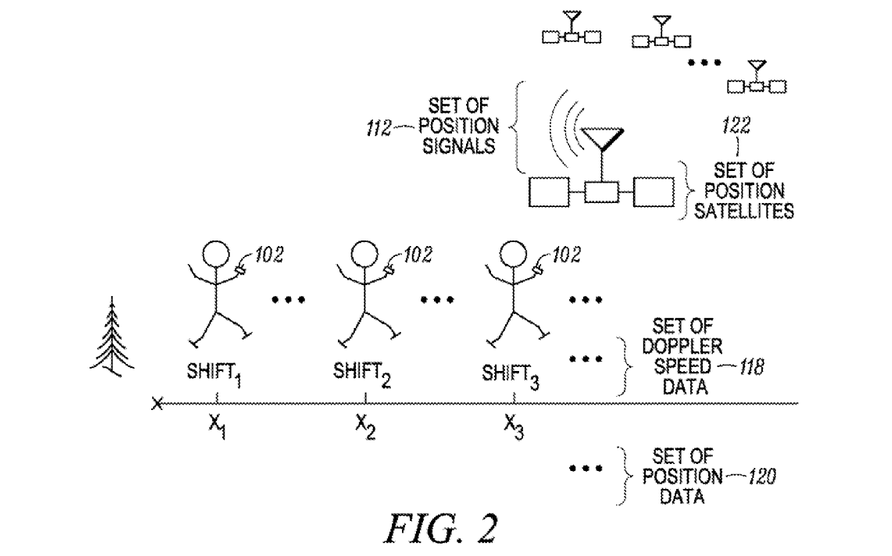
FIG. 2 illustrates an environment in which systems and methods for generating compensated speed values for a Doppler-enabled device can be used to generate or estimate a speed value, according to various implementations.

In one illustrative operating environment, and as for instance illustrated in FIG. 2, the device 102 can be worn, attached to, and/or carried by a user located in an environment, such as an outdoor trail, track, park, and/or other set of surroundings that permits the receipt of a set of position signals 112 from a set of satellites 122. The position signals may have two features: (1) a carrier frequency that can be used to compute a speed for the device 102 using Doppler calculations and (2) timing and location (e.g., GPS satellite "phase" and "ephemeris") information that can be used to compute the position of the device 102 at a particular time, and these calculations can be used to develop a position-based speed for the device 102.

The set of navigation satellites 122 can be or include a set of GPS satellites, or others. Although this implementation obtains position signals from satellites for both Doppler-based speed calculations and position-based speed calculations, other implementations may use terrestrial base stations for Doppler-based speed calculations and GPS satellites for position-based speed calculations (or vice versa). Alternately, position signals from terrestrial base stations may be used for both Doppler-based speed calculations and position-based speed calculations.

The user can use or operate the device 102 in connection with a variety of activities, including, merely for example, long distance running events, hiking on public trails, and other athletic, personal recreation, and/or other activities. While in motion during those or other activities, the device 102 can capture various data to generate, compute, or estimate a current speed of the user and/or device 102. According to implementations, the set of position signals 112 and associated information can be used to derive the current speed value of the device 102 using multiple techniques. One technique will be referred to as a Doppler-based speed calculation, which uses knowledge of the Doppler Effect to calculate speed based on a carrier frequency shift of the received position signals 112. Another technique will be referred to as a position-based speed calculation, which uses the definition of "change in distance over change in time" to calculate speed.

The data used to produce a position-based speed value can include, as shown, a set of receiver position data 120 with associated time stamps for each position. The set of receiver position data 120 can be received or derived from the timing and location data in a set of position signals 112 received from the set of position satellites 122. The set of position signals 112 and/or associated information can be received and initially processed by the navigation engine 110 of the device 102, to extract location or position, time, and/or other values for a series of position and timing measurements for the device 102.

The speed comparison module 116 can generate a position-based speed value by direct calculation of the distance between measured receiver positions divided by the time stamp values for successive positions of the device 102. In implementations, the current position-based speed value can be averaged over a predetermined number of position measurements, and/or can be computed using other techniques using the position and time information from the received set of position data 120. In implementations, the speed comparison module 116 can be configured to continuously or periodically generate the position-based speed values and combine those values with Doppler-based speed values from the navigation engine 110 to generate a more accurate and/or more fade-resistant speed output.

More specifically, in certain conditions or environments, the set of position signals 112 received by the navigation engine 110 can be obscured, faded, or degraded, for example due to signal interference caused by densely constructed areas of a city (e.g., urban canyons), heavy foliage, severe weather conditions, and/or other phenomena or conditions. In those types of environments or others, the navigation engine 110 may be unable to generate accurate Doppler-based speed data 118 from the position signals 112.

Figure 3:
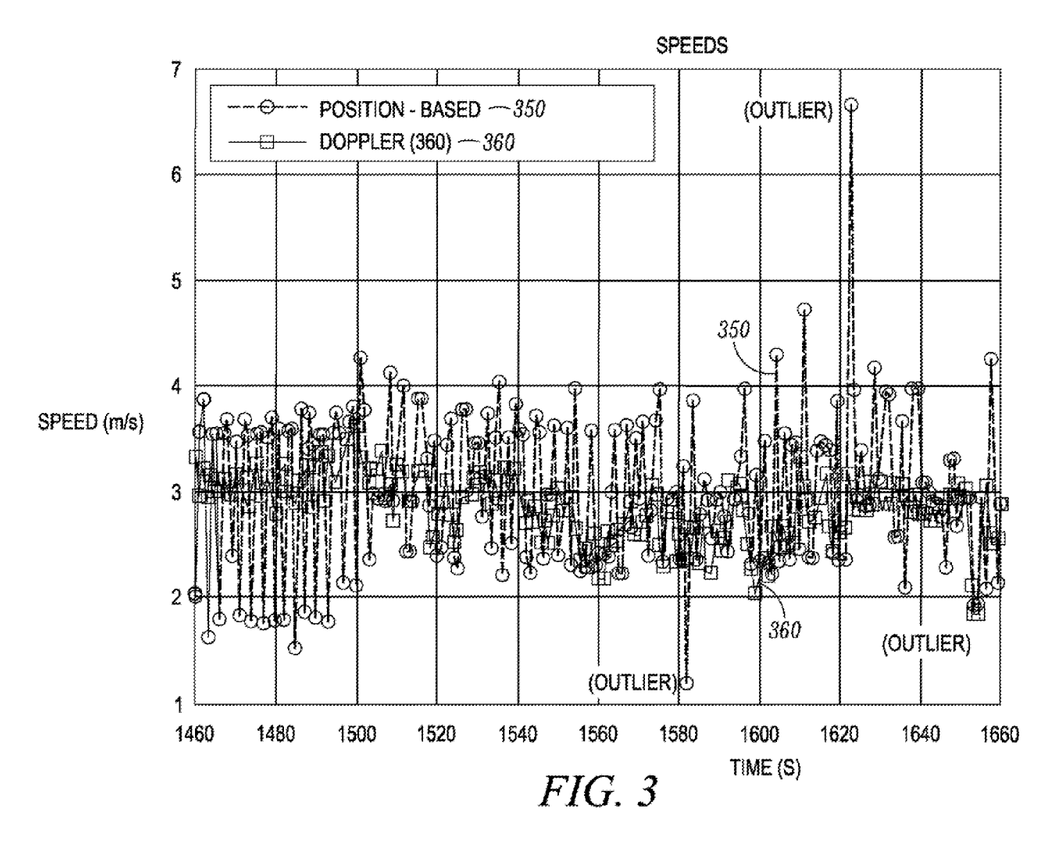
FIG. 3 illustrates a graph of empirical speed data including position-based and Doppler-based speed readings, including position-based outliers.

FIG. 3 illustrates a graph of empirical speed data measured by the inventors during investigations of the subject matter herein, which shows the variability of both the position-based and Doppler-based speeds. The data in FIG. 3 were collected under conditions in which the user of device 102 was running at a nearly constant speed of 3 meters per second (6.7 miles per hour, or a 9-minute mile pace). In the illustrated data, the position-based speed data 350 shows a comparatively larger deviation around the mean, including low and high speed value outliers (near t=1580 sec and 1620 sec) which are larger than the outliers seen in the Doppler-based speed data 360 (such as just before t=1660 sec). Both signals show large variations over time which necessitates filtering of both signals to provide smooth speed and pace feedback to a user of device 102. It can be seen that even though the position-based speed data 350 has a greater variance than the Doppler-based speed data 360, the position-based speed data 350 has a more accurate mean value than the Doppler-based speed data 360. The two sets of speed data are therefore complementary in nature and, if combined appropriately, can generate a more accurate speed than either source individually. Comparing the mean values, it is evident that the Doppler-based speed data 360 tended to dip or sink by a relatively significant amount compared to the position-based speed (see 1560 sec to 1660 sec).

Figure 4:
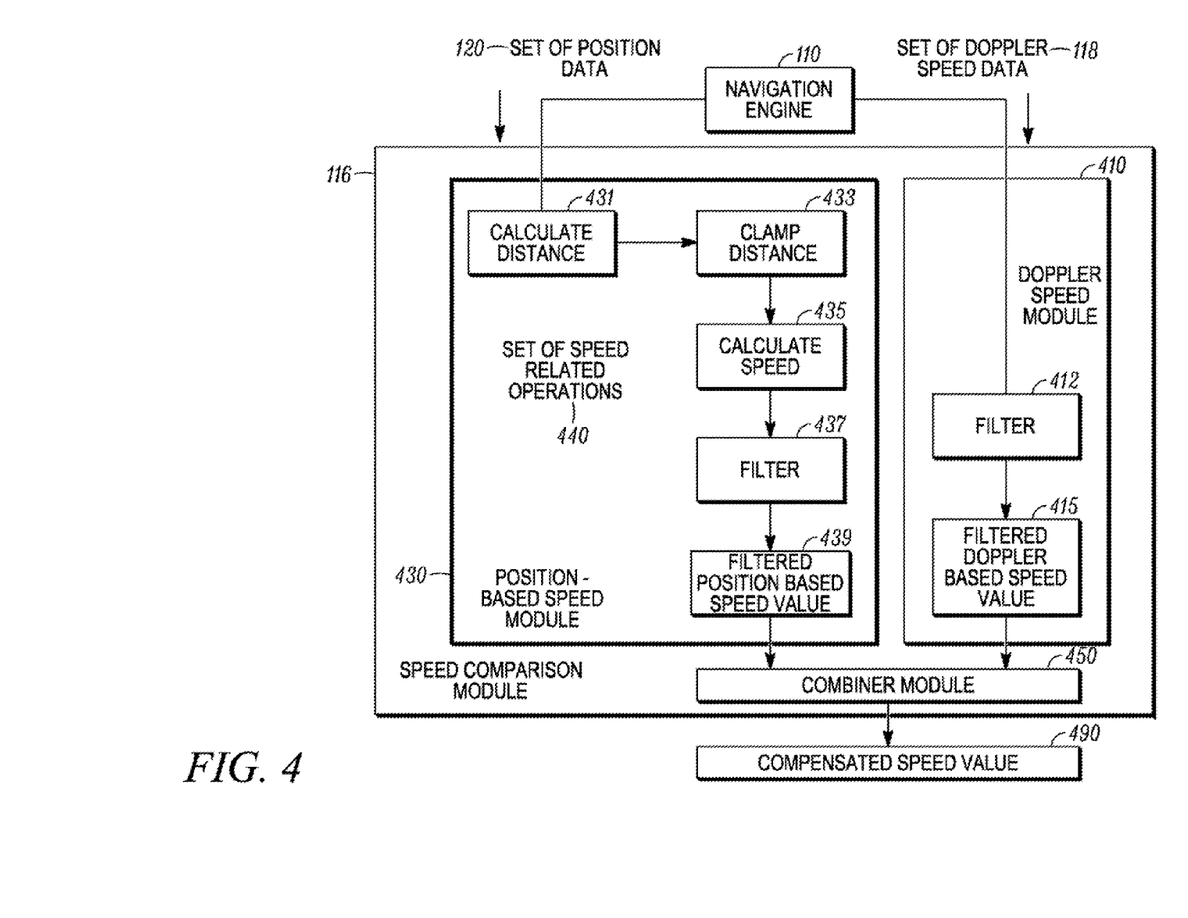
FIG. 4 illustrates various modules and operations that can be incorporated in a speed comparison module for use in systems and methods for generating compensated speed values for a Doppler-enabled device, according to various implementations.

In order to compensate for adverse operating conditions and inaccurate Doppler speed data, and as shown for example in FIG. 4, the speed comparison module 116 of the device 102 can be configured to perform certain operations independently on the Doppler-based speed data and the position-based speed data. In implementations, the speed comparison module 116 can contain, host, and/or access a set of resources to perform combination operations on position-based and Doppler-based speed data. In implementations as shown, those resources can include processing modules dedicated to position-based speed calculations and Doppler-based speed calculations, respectively, as well as to combination operations. Those modules as illustrated can include a position-based speed module 430 and a Doppler speed module 410, along with other modules, logic, services, and/or hardware.

More particularly, the speed comparison module 116 can generate a filtered Doppler-based speed value 415 using the Doppler speed module 410. The Doppler speed module 410 receives the set of Doppler speed data 118 from the navigation engine 110 and operates on that data to derive filtered Doppler-based speed data 415. The filter 412 can be or include a Kalman filter, and/or can be implemented using other types or classes of filtering algorithms or techniques. The filter 412 can generate the filtered Doppler-based speed value 415 as an output, based on Kalman and/or other filtering operations.

The position-based speed module 430 of the speed comparison module 116 can be configured to derive a filtered position-based speed value 439 independently of the filtered Doppler-based speed value 415. To generate that value, the position-based speed module 430 can communicate with the navigation engine 110 to receive the set of receiver position data 120 derived from the timing and location information in the set of position signals 112. The position-based speed module 430 can host and/or execute a set of speed-related operations 440 which are conducted on the set of position data 120. The set of speed-related operations 440 can include a distance calculation operation 431, in which the position-based speed module 430 determines the distance traveled between two position readings reflected in the set of position data 120. In implementations, the two position values or readings can be successive or consecutive readings of the position of the device 102, for instance at successive time increments, but can also or instead be or include readings or values taken at multiple time increments.

The set of speed-related operations 440 can include a clamping operation 433 on the distance value determined from the set of position data 120, to limit values of the calculated distance to predetermined ranges which are deemed to represent realistic or reasonable changes in position by a user who is walking, running, or otherwise traveling with the device 102. Thus, for instance, the calculated distance can be clamped to a maximum traveled distance of one and one half times the previously determined speed multiplied by the time since the last position measurement. The set of speed-related operations 440 can further include a speed calculation operation 435 based on the (clamped or limited) distance value determined in the set of speed-related operations 440. The speed calculation operation 435 can represent the direct division of the distance traveled over the time interval during which that distance was traveled, yielding a position-based speed value. That value can, again, be expressed in different units, such as miles per hour or meters per second. After generating a position-based speed or initial speed derived from position values, the position-based speed module 430 can apply a filter 437 to that speed value to produce a filtered position-based speed value 439.

In implementations, the filter 437 can be or include a Kalman filter, and/or can be implemented using other types or classes of filtering algorithms or techniques. The filter 437 can generate the filtered position-based speed value 439 as an output, based on Kalman and/or other filtering operations.

According to aspects, the filtered position-based speed values 439 and filtered Doppler speed values 415, or sets of such values, when generated using Kalman filtering techniques in the filters 437 and 412, respectively, exhibit a better balance between noise suppression and response time than could be obtained using more traditional filters, such as finite and infinite impulse response (FIR and IIR) filters. These conditions are necessary to provide acceptable speed and pace information to the user of device 102 via display 106. Note that although the two filters 437, 412 may both be Kalman filters, they would be implemented or "tuned" independently.

Figure 5:
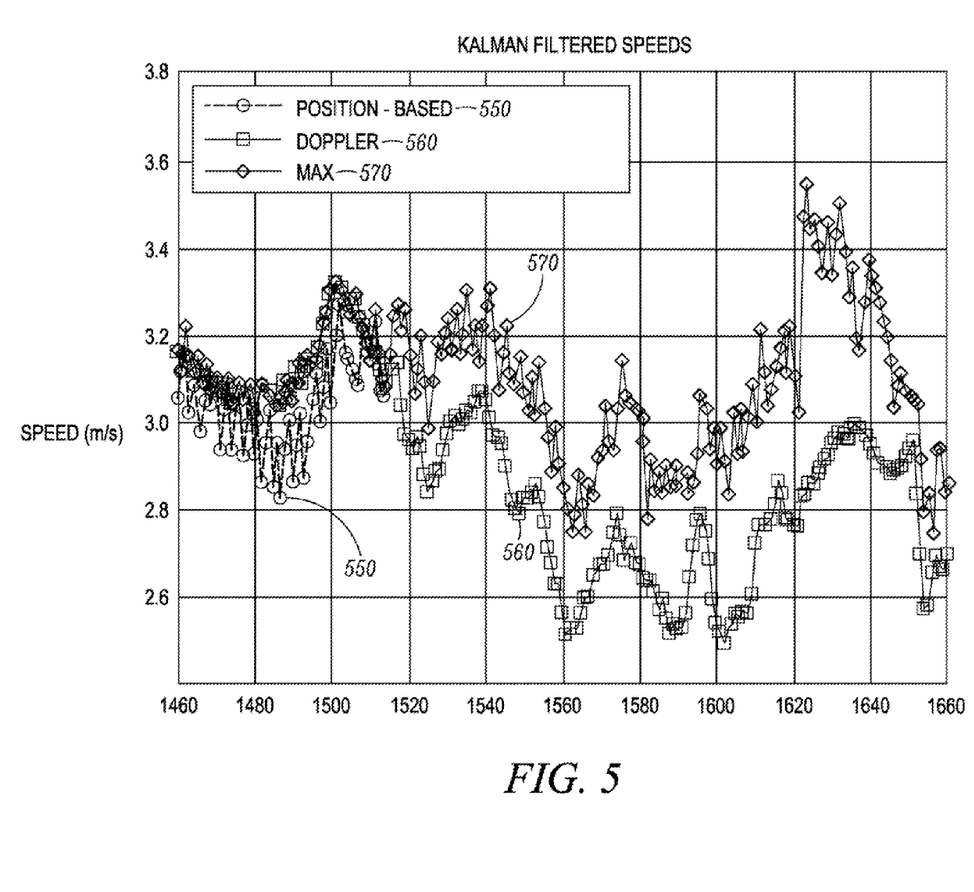
FIG. 5 illustrates a graph of empirical, filtered speed data including position-based and Doppler-based speed readings.

In low-signal conditions, which affect the signal strength of the set of received position signals 112, the filtered position-based speed value 439 processed by the position-based speed module 430 may be less adversely affected than the set of filtered Doppler speed data 415. FIG. 5 illustrates a graph of further empirical data measured by the inventors during investigations of the subject matter herein. As shown in that data, as a result of operations described herein, the filter 437 and/or the filter 412 can be tuned to the variance of its source (in this case, the position-based speed data 350 and Doppler-based speed data 360 from FIG. 3) and in which position-based outliers can be clamped by previous speed and elapsed time values. As shown, and recalling that the user of the device was moving at a steady 3 meters per second, the filtered Doppler-based speed data 560 more clearly exhibits drops in value compared to the filtered position-based speed data 550. The filtered position-based speed and filtered Doppler-based speed can be combined by a combiner module 450 (see FIG. 4) to select the maximum of the two values to reduce Doppler dips or other artifacts, shown as the max speed data 570.

More particularly, in implementations, the combiner module 450 of the speed comparison module 116 can perform combination operations on the filtered position-based speed value(s) 439 and the filtered Doppler-based speed value(s) 415 to generate compensated speed value(s) 490 that are more accurate under degraded signal conditions than the filtered Doppler speed value 415 alone. In implementations, the combiner module 450 can be configured to receive both the filtered position-based speed value(s) 439 and the filtered Doppler-based speed value(s) 415, and combine those values using a predetermined rule or rules. In implementations, the set of rules can be or include the identification or selection of the largest or greatest value of those two speed values as the compensated speed value 490. Again, this type of combination may be motivated by the tendency of the filtered Doppler-based speed value(s) 415 to undergo drops during signal fade, in comparison to the filtered position-based speed value(s) 439. It will be appreciated, however, that other combination rules and/or types of combination operations can be performed by the combiner module 450. Those further combination rules or operations can include, for example, an averaging of the filtered position-based speed value(s) 439 and the filtered Doppler-based speed value(s) 415 (with or without static or dynamic weighting), a thresholding operation applied to one or both of those values, and/or others.

Figure 6:
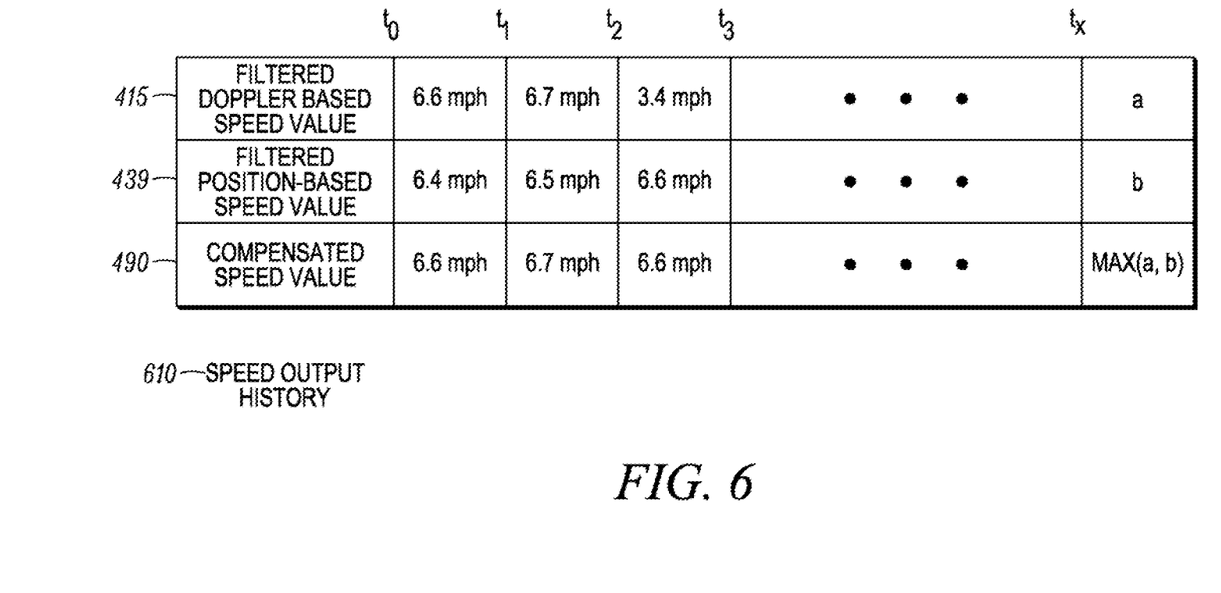
FIG. 6 illustrates a speed output history reflecting a series of compensated speed values that can be generated using systems and methods for generating compensated speed values for a Doppler-enabled device, according to various implementations.

In terms of the characteristics of the compensated speed value(s) 490, as noted, the combination operations applied by the combiner module 450 can tend to smooth out the excursions in speed values that would be present in the filtered Doppler-based speed value(s) 415, alone. FIG. 6 illustrates an example of a speed output history 610 for a user of the device 102 over a series of time increments ($t_0$, $t_1$, $t_2$, $t_3$, . . . $t_x$), in which the compensated speed value(s) 490 are the greater of the filtered position-based speed value(s) 439 and the filtered Doppler-based speed value(s) 415. In examples as shown, the compensated speed value(s) 490 that are generated and shown to the user via display 106 of the device 102, or otherwise, can remain within a consistent range of values (6.6-6.7 miles per hour), even during periods of temporary signal fade or degradation leading to one or more spurious values for the filtered Doppler-based speed value(s) 415 (illustratively, a drop to 3.4 miles per hour at $t_2$). Other values, increments, and histories can be reflected in the speed output history 610 for a given user or users, but in general, the compensated speed value(s) 490 can reflect a more consistent set of speed readings than with the filtered Doppler-based speed value(s) 415 alone.

Figure 7:
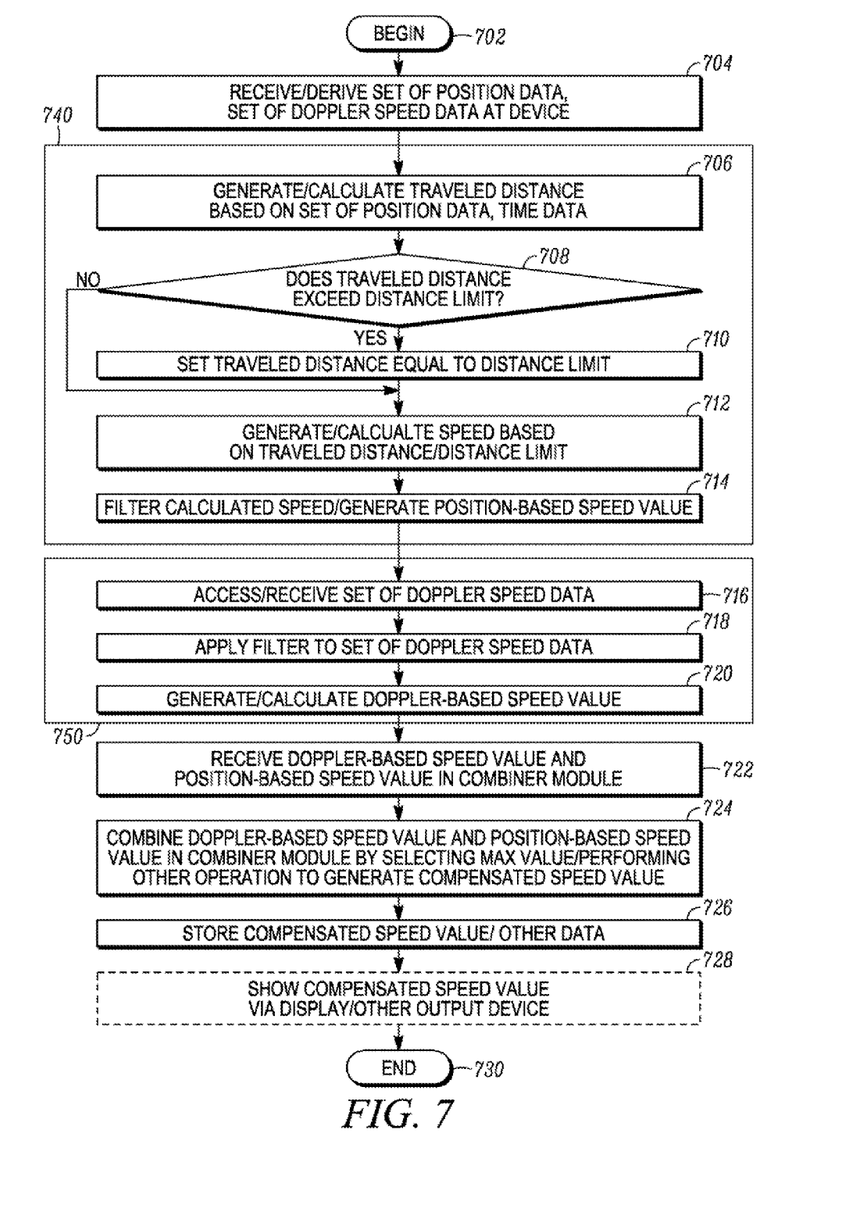
FIG. 7 illustrates a flowchart of processing that can be used in systems and methods for generating compensated speed values for a Doppler-enabled device, according to various implementations.

FIG. 7 illustrates a flowchart of speed determination and other processing that can be performed in systems and methods for generating compensated speed values for a Doppler-enabled device, according to various aspects. In step 702, processing can begin at a speed comparison module 116. In step 704, the speed comparison module 116 in the device 102 can receive and/or derive the set of position data 120 and the set of Doppler speed data 118, for instance from the navigation engine 110. Note that the navigation engine 110 may generate this information from a received set of position signals 112 transmitted by the set of navigation satellites 122. Next, steps 740 and 750 may be performed in parallel, may be performed with step 740 occurring prior to step 750, or may be performed with step 750 occurring prior to step 740. Additionally, steps 740 and 750 need not occur at the same frequency. In other words, step 750 may occur twice for each time that step 740 occurs.

In step 706 within step 740, the position-based speed module 430 can generate and/or calculate a traveled distance for the device 102 based on the set of position data 120 and time data associated with the set of position data 120, such as time stamps recording the date and time at which each position was recorded or identified based on the set of position signals 112.

In optional step 708, a determination can be made by the position-based speed module 430 whether the traveled distance exceeds a predetermined distance limit. The predetermined maximum distance limit can reflect the greatest increment of distance that a user of device 102 can be expected to travel within a given time interval. For instance, for a user who is operating device 102 while running, the distance clamp and/or other limit can be set to a value of, merely for illustration, one and one half times the previously determined speed multiplied by the time since the last position measurement. The optional clamp or limit is designed to represent the largest distance that a user moving at the previously determined speed could be expected to cover in the following interval of time. In implementations, the distance clamp and/or other limit can be set to other fixed or non-fixed values, such as a distance value of no more than 10% greater than that possible at the user's previously recorded top speed or a maximum speed of 15 miles per hour. Other values, ranges, parameters, and/or functions can be used to determine the distance clamp and/or other limit. Different distance clamp and/or other limit values can be used for different users of the same device 102, and/or different devices.

If the determination in step 708 is no, processing can proceed to step 712. If the determination in step 708 is yes, processing can proceed to step 710. In step 710, the traveled distance can be set to the distance limit or clamp value, and/or to another maximum value. After step 710, processing can proceed to step 712.

In step 712, the position-based speed module 430 can generate and/or calculate the current position-based speed of the device 102 based on the traveled distance (or the distance limit, if the distance clamp was applied in steps 708 and 710). The calculation can be or include the change in distance divided by the change in time. In step 714, the position-based speed module 430 can filter the calculated position-based speed using the filter 437 to generate a filtered position-based speed value 439. In implementations, the filter 437 used by the position-based speed module 430 can be or include a Kalman filter, but it will be appreciated that other types or classes of filters can be applied to the position-based speed data generated from position values.

In step 716 within step 750, the Doppler speed module 410 of the speed comparison module 116 can receive the set of Doppler speed data 118 from the set of position signals 112 transmitted by the set of navigation satellites 122. In step 718, the Doppler speed module 410 can apply the filter 412 to the received set of Doppler speed data 118. In implementations, the filter 412 used by the Doppler speed module 410 can be or include a Kalman filter, but it will be appreciated that other types or classes of filters can be applied to the Doppler speed data.

In step 720, the Doppler speed module 410 can generate and/or calculate filtered Doppler-based speed value(s) 415 based on the output of the filter 412, such as a Kalman filter.

In step 722, the filtered Doppler-based speed value(s) 415 and the filtered position-based speed value(s) 439 for the same distance and/or time period can be received or accessed by the combiner module 450. In step 724, the combiner module 450 can combine the filtered Doppler-based speed value(s) 415 and the filtered position-based speed value(s) 439 by selecting a maximum of those two values, and/or performing other operations on or applying other rules to those two sets of quantities. The combiner module 450 can generate a compensated speed value 490 or a set of such values as a result of the selection and/or other operation(s).

In step 726, the speed comparison module 116 can store the compensated speed value(s) 490 and/or other data recording speed activity for the user of device 102, for instance, in local memory of the device 102. In implementations, the compensated speed value(s) 490 and/or other data can be uploaded or transmitted to other local or remote storage associated with the user of the device 102, for instance to a network database or a cloud repository. In optional step 728, the speed comparison module 116 can show the compensated speed value(s) 490 via the display 106 and/or other output component. In step 730, processing can repeat, return to a prior processing point, jump to a further processing point, or end.

It will be appreciated that while various processing activity, logical decisions, and/or other operations illustrated in FIG. 7 have been described as taking place in steps, that two or more of those operations or activities can be combined into one operation or activity, and that any one or more of those operations or activities can be divided into two or more operations or activities. Moreover, while those various operations or activities have been illustrated and described as occurring in a certain order, it will be appreciated that in implementations, those same and/or other operations or activities can take place in a different order or orders. Further, while various operations or activities have been described as being carried out by certain hardware, software, service, and/or other resources, it will be appreciated that in implementations, the same activities and/or operations can be carried out by other hardware, software, service, and/or other resources.

It will be appreciated that various hardware, software, and other resources can be used in implementations of systems and methods for generating compensated speed values for a Doppler-enabled device, according to implementations. For instance, in implementations, the device 102 can comprise a platform including a processor communicating with memory, such as electronic random access memory, operating under control of or in conjunction with the operating system 108. The processor in implementations can be incorporated in one or more microprocessors, microcontrollers, chips, servers, clusters, and/or other computers or hardware resources, and/or can be implemented using cloud-based resources. The operating system 108 can be, for example, a distribution of the Linux™ operating system, the Unix™ operating system, or other open-source or proprietary operating system or platform. The RF circuitry 114 of the device 102 can include resources such as a transceiver, a modulator/demodulator, and an application programming interface (API) which can interface to a set of applications, such as communications, messaging, texting, telephony, browser, and/or other applications or services. The processor of device 102 can also interface with a data store, such as a database stored on a local hard drive or drive array, to access or store position data, speed data, and/or subsets of selections thereof, along with other content, media, or other data. The processor can, in general, be programmed or configured to execute control logic and to control various processing operations, including to generate and/or interface to the speed comparison module 116 and/or other hardware, module, application, and/or service, and/or other model, engine, logic, application, and/or service, the navigation engine 110, and/or other resources. Other configurations of the device 102, associated radio frequency hardware or software, network connections, and other hardware, software, and service resources are possible.

The foregoing description is illustrative, and variations in configuration and implementation may occur to persons skilled in the art. For example, while implementations have been described in which the position-based speed module 430 and the Doppler speed module 410 each incorporate one filter (filter 437 and filter 412, respectively), in implementations, those modules can incorporate multiple filters and/or other processing units, modules, and/or nodes. In implementations, for further example, more than one module can perform the same operations as each of the individual position-based speed module 430 and the Doppler speed module 410. Other resources described as singular or integrated can in implementations be plural or distributed, and resources described as multiple or distributed can in implementations be combined. The scope of the present teachings is accordingly intended to be limited only by the following claims.

What is claimed is:

1. A portable device, comprising:
a wireless interface configured to receive a set of position signals; and
a processor, communicating with the wireless interface to receive a set of position coordinates and a corresponding set of timestamp values based on the set of position signals and to receive a set of Doppler speed values based on the set of position signals, the processor being configured to
generate a first position-based speed value representing a speed of the portable device based on the set of position coordinates and the corresponding set of timestamp values, filter the first position-based speed value to generate a second position based speed value representing a filtered position-based speed of the portable device,
filter a first Doppler-based speed value to generate a second Doppler based speed value representing a filtered Doppler-based speed of the portable device,
compare the second position-based speed value and the second Doppler based speed value, and
generate a compensated speed value representing the speed of the portable device based on the comparison.

2. The portable device of claim 1, further comprising:
a navigation engine configured to receive the set of position signals and produce the set of position coordinates and the corresponding set of timestamp values and also produce the set of Doppler speed values.

3. The portable device of claim 2, wherein the navigation engine comprises a Global Positioning System (GPS) receiver.

4. The portable device of claim 1, wherein the filter of the first position-based speed value implements a Kalman filter to generate the second position-based speed value from at least the first position-based speed value.

5. The portable device of claim 1, wherein the filter of the first Doppler-based speed value implements a Kalman filter to generate the second Doppler-based speed value from at least the first Doppler-based speed value.

6. The portable device of claim 1, wherein the first position-based speed value is generated by dividing a traveled distance value by an elapsed time value as determined from the set of position coordinates and the corresponding set of timestamp values.

7. The portable device of claim 6, wherein the processor is further configured to apply a clamp function to the set of position coordinates to limit the traveled distance value used to generate the first position-based speed value.

8. The portable device of claim 1, wherein the comparison of the second position based speed value and the second Doppler-based speed value identifies a greatest value of the second position-based speed value and the second Doppler-based speed value.

9. The portable device of claim 8, wherein the generation of the compensated speed value selects the greatest value.

10. The portable device of claim 1, further comprising:
a memory, coupled to the processor, configured to store a plurality of compensated speed values as a speed output history for the portable device.

11. A computer implemented method to determine the speed of a portable device, comprising:
receiving, by a portable device, a set of positioning signals;
generating, by the portable device, a set of position coordinates of the portable device and a corresponding set of timestamp values based on the set of positioning signals;
generating, by the portable device, and a set of Doppler speed values based on the set of positioning signals;
generating, by the portable device, a first position-based speed value representing a speed of the portable device based on the set of position coordinates and the corresponding set of timestamp values, filter the first position-based speed value to generate a second position based speed value representing a filtered position-based speed of the portable device;
filtering, by the portable device, a first Doppler-based speed value to generate a second Doppler based speed value representing a filtered Doppler-based speed of the portable device;
comparing, by the portable device, the second position-based speed value and the second Doppler based speed value; and
generating, by the portable device, a compensated speed value representing the speed of the portable device based on the comparison.

12. The method of claim 11, wherein receiving the set of position signals, generating the set of position coordinates and the corresponding set of timestamp values and producing the set of Doppler speed values is performed by a navigation engine of the portable device.

13. The method of claim 12, wherein the navigation engine comprises a Global Positioning System (GPS) receiver.

14. The method of claim 11, wherein the filtering of the first position-based speed value implements a Kalman filter to generate the second position-based speed value from at least the first position-based speed value.

15. The method of claim 11, wherein the filtering of the first Doppler-based speed value implements a Kalman filter to generate the second Doppler-based speed value from at least the first Doppler-based speed value.

16. The method of claim 11, wherein the first position-based speed value is generated by dividing a traveled distance value by an elapsed time value as determined from the set of position coordinates and the corresponding set of timestamp values.

17. The method of claim 16, further comprising, applying a clamp function to the set of position coordinates to limit the traveled distance value used to generate the first position-based speed value.

18. The method of claim 11, wherein the comparison of the second position based speed value and the second Doppler-based speed value identifies a greatest value of the second position-based speed value and the second Doppler-based speed value.

19. The method of claim 18, wherein the generation of the compensated speed value selects the greatest value.

* * * * *